United States Patent [19]

Kaplan

[11] Patent Number: 5,528,678
[45] Date of Patent: Jun. 18, 1996

[54] REVERTIVE CALLING AUTOMATIC CALL DISTRIBUTOR

[75] Inventor: Marc P. Kaplan, Aberdeen, N.J.

[73] Assignee: AT&T Corp., Murray Hill, N.J.

[21] Appl. No.: 173,845

[22] Filed: Dec. 27, 1993

[51] Int. Cl.⁶ .................................................. H04M 3/42
[52] U.S. Cl. .......................... 379/201; 379/112; 379/92; 379/207; 379/220; 379/265; 379/230
[58] Field of Search ..................................... 379/201, 209, 379/230, 211, 212, 196, 207, 213, 202, 204, 205, 96, 309, 265, 92, 112, 220

[56] References Cited

U.S. PATENT DOCUMENTS

| | | | |
|---|---|---|---|
| 3,792,202 | 2/1974 | Adams, Jr. et al. | 379/205 |
| 3,912,874 | 10/1975 | Botterell et al. | 379/205 |
| 4,577,065 | 3/1986 | Frey et al. | 379/204 |
| 4,635,251 | 1/1987 | Stanley et al. | 379/204 |
| 5,164,983 | 11/1992 | Brown et al. | 379/207 |
| 5,278,894 | 1/1994 | Shaw | 379/230 |
| 5,291,551 | 3/1994 | Conn et al. | 379/201 |
| 5,303,301 | 4/1994 | Takahata | 379/209 |
| 5,309,513 | 5/1994 | Rose | 379/309 |
| 5,311,574 | 5/1994 | Livanos | 379/209 |
| 5,311,583 | 5/1994 | Friedes et al. | 379/209 |
| 5,325,424 | 6/1994 | Grube | 379/201 |
| 5,327,486 | 7/1994 | Wolff et al. | 379/96 |
| 5,329,581 | 7/1994 | Friedes et al. | 379/201 |
| 5,361,295 | 11/1994 | Solomon et al. | 379/213 |
| 5,369,694 | 11/1994 | Bales et al. | 379/202 |
| 5,392,345 | 2/1995 | Otto | 379/309 |

*Primary Examiner*—Jeffery Hofsass
*Assistant Examiner*—Scott Wolinsky

[57] ABSTRACT

A cooperative network/premises-based automatic call distributor system and method is provided which minimizes networking costs associated with distributing calls to telemarketing agents in multiple locations, minimizes delays in providing desired services to callers, and improves the efficiency of telemarketing agents. A call directed to a telemarketing complex arrives at the network. The caller automatic number identification (ANI) and an identifying tag are forwarded via a data connection to a telemarketing agent management system which identifies an available and desired agent to service the call, and launches a call to the network location associated with the original caller, thus completing the connection. The telemarketing agent management system selects an appropriate agent based on data received from the telemarketing complex and from the network. Interactive queuing may also be performed by the network to provide additional information to assist call distribution and telemarketing agent response. In a further embodiment, the telemarketing agent management system may retrieve caller profile information while the revertive call is launched to the network location associated with the caller. In addition, telemarketing agents may be strategically assigned a priori to network switch locations resulting in superior call setup characteristics for certain calls.

16 Claims, 4 Drawing Sheets

FIG. 3
REVERTIVE CALLING NETWORK ACD

FIG. 4

REVERTIVE CALLING AUTOMATIC CALL DISTRIBUTOR

TECHNICAL FIELD

The present invention relates generally to a method for telemarketing, and more particularly, to a network assisted method for automatic call distribution.

BACKGROUND OF THE INVENTION

Telemarketing, i.e., the use of telecommunications systems for sales purposes, is widely used by retailers, wholesalers, or more generally, vendors for selling services and equipment and for providing customer information with respect to such sales. A vendor-provided automatic call distributor (ACD) typically connects customers calling that vendor to one of a group of attendants, generally at one premise, who accept orders and/or provide customer information to the caller. The routing and queuing functions provided by the ACD preferably makes most efficient use of all available agents, allowing the agents time between calls to perform necessary and ancillary functions related to customer service, while minimizing delays and busy signals to the customer.

Since an ACD services a single premise, efficient management of the queue at a premise is limited. Methods to manage incoming calls among different premises have included both network and premises based solutions. An example of a premises based solution is the programming of each ACD to determine if its existing capacity threshold is exceeded. If the capacity threshold is exceeded, the affected ACD queries a first "overflow" ACD via an interflow trunk to determine if it can accept the call without exceeding its threshold. If the threshold is not exceeded, the "overflow" ACD will accept the call. If the ACD threshold will be exceeded, the next overflow ACD is queried via another interflow transfer, and the process of call acceptance or additional ACD queries is repeated until the call is ultimately accepted by an ACD, is blocked, or the calling party disconnects. This solution is undesirable because of the expense of required interflow trunks and the general inability of the method to address call congestion at any ACD on a campaign-by-campaign basis.

An example of a network solution is the use of the 800 service Service Management System (SMS) to realize multi-locational capabilities. For example, based on traffic statistics to various premises, as well as the time zone and related staffing of the respective premises, calls to telemarketing agents via 800 numbers are routed by the network to an appropriate premise, which then receives the call and routes it to an agent via the premise ACD. This type of routing is based on statistical averages, and therefore, cannot account for realtime fluctuations in the calling load. Furthermore, such a method only accounts for calls to 800 numbers; customer service premises may also receive a large number of calls via local exchange companies (LECs) as well as foreign exchanges.

Thus, rather than focusing on maintaining balanced levels of service among ACDs, the prior art has focused primarily on methods that prevent the blocking of calls from the public switched telecommunications network (PSTN) at any of a plurality of ACDS or methods that result in balanced distribution of calls among a plurality of ACDs where access to the network of ACDs is gained through one toll-free telephone number. The following patents are illustrative of this prior art.

U.S. Pat. No. 4,191,860 issued to R. P. Weber on Mar. 4, 1980, allows calls to be allocated to individual ACDs on a fixed percentage basis as specified by the telemarketer. This method does not have the capability to dynamically adapt to variable conditions encountered when load balancing is attempted. Other arrangements have been devised where load balancing is attempted by semiautomatic means.

U.S. Pat. No. 4,611,094 issued to R. L. Asmuth et al. on Sep. 9, 1986, describes a method that allows a telemarketer to customize 800 service call processing logic based on additional call processing instructions obtained from a call originator. While this method may be used to redirect call among ACDs in response to information provided by call originators, its usefulness as a means of load balancing is dependent upon the ability of the telemarketer to change parameters and re-initiate the customer record program that directs specific announcements to callers. This method is ill prepared to meet a telemarketer's need to modify call processing logic in order to 14 accomplish real-time load balancing.

U.S. Pat. No. 4,737,983 issued to J. C. Frauenthal et al. on Apr. 12, 1988, describes a method for balancing 800 telephone service call loads based on the state of traffic congestion at each of the multiple locations receiving calls. A switching office receiving a call destined for one of the telemarketer's ACDs may query a central database to determine the current state of traffic congestion for a plurality of the telemarketer's ACDs and—based on that information—direct the call to an alternate ACD when warranted. This method is limited to load balancing of premises queues, and does not consider the fact that call handling capabilities may vary among locations receiving calls.

U.S. Pat. No. 4,788,718 issued to S. D. McNabb and R. S. Yien on Nov. 29, 1988, describes a method and network arrangement for compiling PSTN traffic analysis data for an 800 telephone service, based on call data collected through a common channel signaling (CCS) network. The objective of the McNabb method is to contemporaneously reduce total call blocking to multiple TCs having specialized call handling capabilities that may differ among locations receiving calls. This approach to load balancing relies exclusively on the telemarketer's knowledge of 800 service call volume for a single 800 number and does not consider ACD performance data or any other information that may be obtained from the telemarketer's premises.

In order to improve multi-locational efficiency and dynamic response to load changes, U.S. Pat. No. 5,164,983 issued to Percy B. Brown et al. on Nov. 17, 1992 provides a premises-based telemarketing agent management system for managing a telemarketing complex in which a traffic control center processor receives information from both telemarketer premises-based information sources and PSTN-based information sources, and processes this information in order to dynamically and automatically generate signals for implementing call routing changes needed to balance service among telecommunications centers in the telemarketing complex. However, even such a "real-time" system is limited by having the telemarketing premises management system dynamically control the routing of future calls based on calls already received at the ACDs of the telemarketing complex. Further, such dynamic control requires changing call processing logic programs stored in the PSTN, or recommending changes in staffing levels, or a combination thereof. Such a system, although responsive to the "real time" call load, is limited to managing the call load at a higher level, which generally requires a longer response time, less control, and an inherently more approximate global solution than, for example, control on a call-by-call basis.

Thus, among other limitations, prior art solutions require through-network connections and premises queuing that typically do not realize multi-locational efficiencies and true real time response.

SUMMARY OF THE INVENTION

The present invention overcomes the above, and other, limitations by providing an automatic calling distributor based on revertive calling, wherein overall call distribution efficiency is enhanced by providing routing and queuing functions within the network, managing the queue based on communication between a premises-based telemarketing management system and the network, and connecting the calls to an appropriate agent according to revertive calling. In an embodiment of the present invention, a customer call arriving at the network via a special access dialing code (e.g., "800") is parked at either a network switch or an adjunct processor. The caller automatic number identification (ANI) and an identifying parked-location tag are forwarded via a data connection to a premises-based telemarketing agent management system which identifies an available and desired agent to service the call, and launches an outbound call to the network location associated with the original caller, thus completing the connection. Interactive queuing, as disclosed for example in commonly-assigned U.S. patent application Ser. No. 07/905,056 to Friedes filed on Jun. 26, 1992, may also be performed by the network to provide additional information to assist call distribution and telemarketing agent response. In a further embodiment, the telemarketing agent management system may retrieve caller profile information while the outbound call is launched to the network location associated with the original caller. In addition, telemarketing agents may be strategically assigned a priori to network switch locations resulting in superior call setup characteristics for certain calls.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

The present invention minimizes the networking costs associated with distributing calls to telemarketing agents in multiple locations, minimizes delays in providing desired services to callers, and improves the efficiency of telemarketing agents by providing a cooperative network/premises-based automatic call distributor which maintains a network-based queue, and uses revertive calling techniques to complete the connection between customer and agent. Revertive calling has been disclosed in commonly assigned U.S. patent application Ser. No. 07/843,685 to Carlsen et al., filed on Feb. 28, 1992, which is hereby incorporated by reference.

Figure 1:
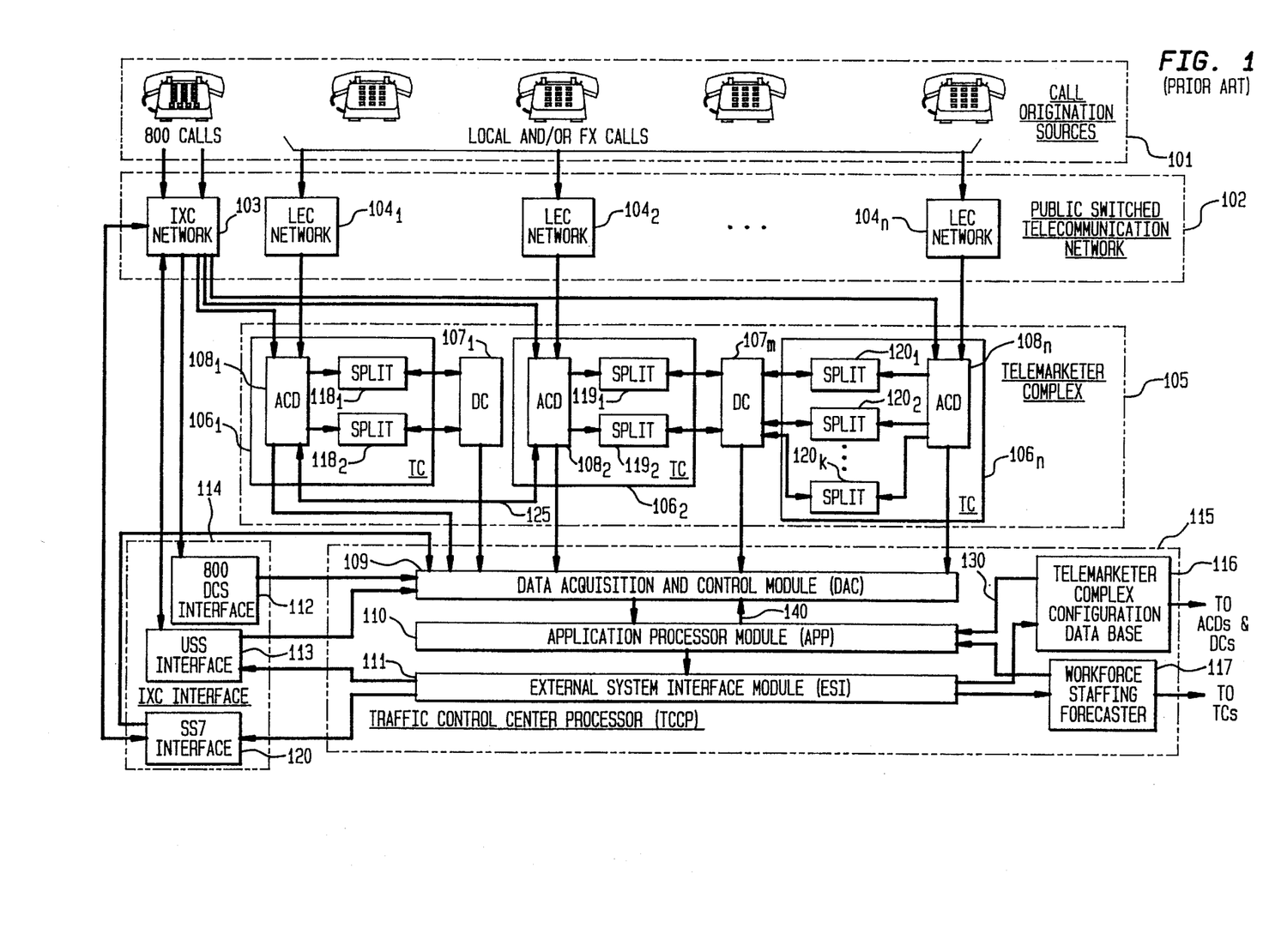
FIG. 1 shows, in simplified form, an exemplary telephone network embodying the principles of the invention.

The present invention will be more readily understood by first considering FIG. 1, which illustrates the relationship between a traffic control center processor (TCCP) 115, a public switched telecommunications network (PSTN) 102, and a telemarketer complex 105, as similarly disclosed in U.S. Pat. No. 5,164,983 to Brown, described above. One skilled in the art recognizes that the present invention is not limited to the system shown in FIG. 1, which is merely illustrative, and is susceptible to many modifications and adaptations.

Telemarketer complex 105 consists of a plurality of telecommunications centers (TCs) 106$_1$ through 106n which may be located in different geographical areas. Typically, each TC includes at least one automatic call distributor (ACD) and one or more "splits/gates" which receive information from the associated ACD at the TC. As used herein, a "split" or "gate" refers to a group of attendant stations (sometimes called "agent terminals") which each comprise an input/out terminal and/or display means which allow an attendant at the TC to process selected calls received by the ACD. For example, as shown in FIG. 1, TC 106$_1$ includes ACD 108$_1$, which provides inputs to a pair of splits 118$_1$ and 118$_2$. TC 106$_n$, on the other hand, includes ACD 108$_n$ and a plurality of splits designated 120$_1$ to 120$_k$. TC 106$_2$ also includes an ACD 108$_2$ which distributes calls to splits 119$_1$ and 119$_2$.

Each of the TCs shown in FIG. 1 is associated with a data center (DC) which typically includes a database containing customer profiles for the telemarketer's customers and other information (such as inventory and capacity data) needed to service incoming calls. For the purposes of this application, this information is generically referred to as "customer order fulfillment data". Specifically, TC 106$_1$ is associated with its own data center, DC 107$_1$, while TCs 106$_2$ and 106$_n$ are both connected to the same DC 107$_m$. Although not shown in FIG. 1, in some arrangements a given TC may be interconnected with more than one DC, and more than two TCs may be supported by the same DC. The DC associated with each TC can receive information from, and transmit information to, agents in each of the splits in the TC. In other situations, no DCs are contained in telemarketer complex 105, and customer order fulfillment data is obtained directly from the caller and/or from other sources such as books or catalogs.

In FIG. 1, ACDs 108$_1$ and 108$_2$ are shown interconnected by an interflow trunk 125, which permits calls to be passed directly from a receiving ACD to an alternate ACD under certain conditions, such as when a malfunction or an overload condition is detected at the receiving ACD. The process by which an overloaded ACD queries an alternate ACD in order to effect transfer of incoming calls is well known to persons skilled in the art of ACD design and operation. As will be further understood hereinbelow, such interflow trunks are not required in practicing the present invention, but are shown as an additional means for routing calls received by the ACDs.

Calls destined for telemarketer complex 105 can originate from any of a plurality of call origination sources 101. Some of the calls are applied to telemarketer complex 105 via any one of a plurality of local exchange carrier (LEC) networks 104$_1$ through 104$_n$ contained within the public switched telecommunications network 102. Other calls, particularly toll-free calls (e.g., "800" calls) are originated in call origination sources 101 and applied to telemarketer complex 105 via interexchange carrier (IXC) network 103, which is also part of the public switched telecommunications network 102. Thus, as shown in FIG. 1 each of the ACDs $108_1$ through $108_n$ can receive and process calls from an associated one of LEC networks $104_1$ through $104_n$, as well as from IXC network 103. ACD 108, receives calls from network $104_1$, ACD $108_2$ receives calls from network $104_2$ etc. Although not shown in FIG. 1, it is well known that the connection between each network 104 and an associated ACD typically involves several trunk groups.

In order to manage and control telemarketer complex 105 and permit efficient handling of traffic originated from call origination sources 101, traffic control center processor (TCCP) 115 is arranged to receive status information from each of the ACDs ($108_1$ through $108_n$) and DCs ($107_1$ through $107_m$) within customer complex 105, in a data acquisition and control module (DAC) 109. This status information describes the service level and other performance measures associated with ACD 108 as well as the status of the telemarketing campaigns served by DCs 107. In addition, DAC 109 preferably is arranged to receive two separate inputs indicative of traffic conditions and call processing logic status within interexchange carrier network 103. First, traffic volume information is received via an 800 Data Collection Service (DCS) system interface 112. An example of an 800 Data Collection Service is described in the above-cited McNabb patent. Second, an input is received from a user support system (USS) interface 113, which provides information relative to the status of "call processing logic" in effect in network 103. The operation and implementation of the call processing logic can be more fully appreciated by reading the aforementioned Weber and Asmuth patents.

In order to correctly process information received from telemarketer complex 105 and IXC network 103 via IXC interface 114, DAC 109 is also provided with information describing parameters and other configuration information that applies to telemarketer complex 105. Data collected in DAC 109 is applied to an application processor (APP) module 110 which processes the information according to a predetermined manner, such as that disclosed in the aforementioned patent to Brown et al. Generally, APP 110 generates a series of control signals which are applied to the external system interface module (ESI) 111 which may include a series of video display monitors as well as software for generating a series of control signals. These control signals are, in turn, applied to USS interface 113 and to a work force staffing forecaster 117. In response to the control signals, USS interface 113 can effect changes in the call processing logic within IXC network 103, while forecaster 117 can effect changes in staffing at various splits 118, 119 or 120 within TCs $106_1$ to $106_n$.

In accordance with the present invention, in addition to receiving inputs indicative of traffic conditions and call processing logic status within IXC network 103, the TCCP also receives signals from IXC network 103 which indicate that an incoming call is parked at the IXC network for connection to an agent. Preferably, a separate data connection [e.g., AT&T's Intelligent Call Processing (ICP) Interface via SS7 TCAP, SNA, X.25, ISDN Non-Call Associated User-to-User Interface (NCA UUI) signaling or TCP/IP] is provided for this signaling, shown schematically as an SS7 data interface 120; however, the DCS interface or the USS interface may be adapted accordingly. As is well known to one skilled in the art, an adjunct processor (AP) (e.g., network services complex "NCSx"), a service control point (SCP) [e.g., network control point (NCP)], or a network switch (e.g., 4ESS or 5ESS) may be involved in receiving the incoming call, signaling the TCCP, receiving the outgoing call, and bridging the incoming and outgoing calls, as will be further described hereinbelow.

It is understood, that the system described in FIG. 1 is merely illustrative of a prior art system which may be readily adapted for practicing the present invention, and that not all of the signaling and information processing described in connection with FIG. 1 is required for practicing the present invention. As a practical matter, however, such information may be useful for providing improved algorithms for call handling and party assignment, or may be essential for the system to implement prior art methods of ACD as an adjunct to the present invention. For example, the ACD system disclosed in the above-referenced patent to Brown may be used for overall system management by providing for changes in the call processing logic within IXC network 103 and in staffing at various splits, while the present invention provides for real-time ACD on a call-by-call basis, as will be further understood by the ensuing description.

Figure 2:
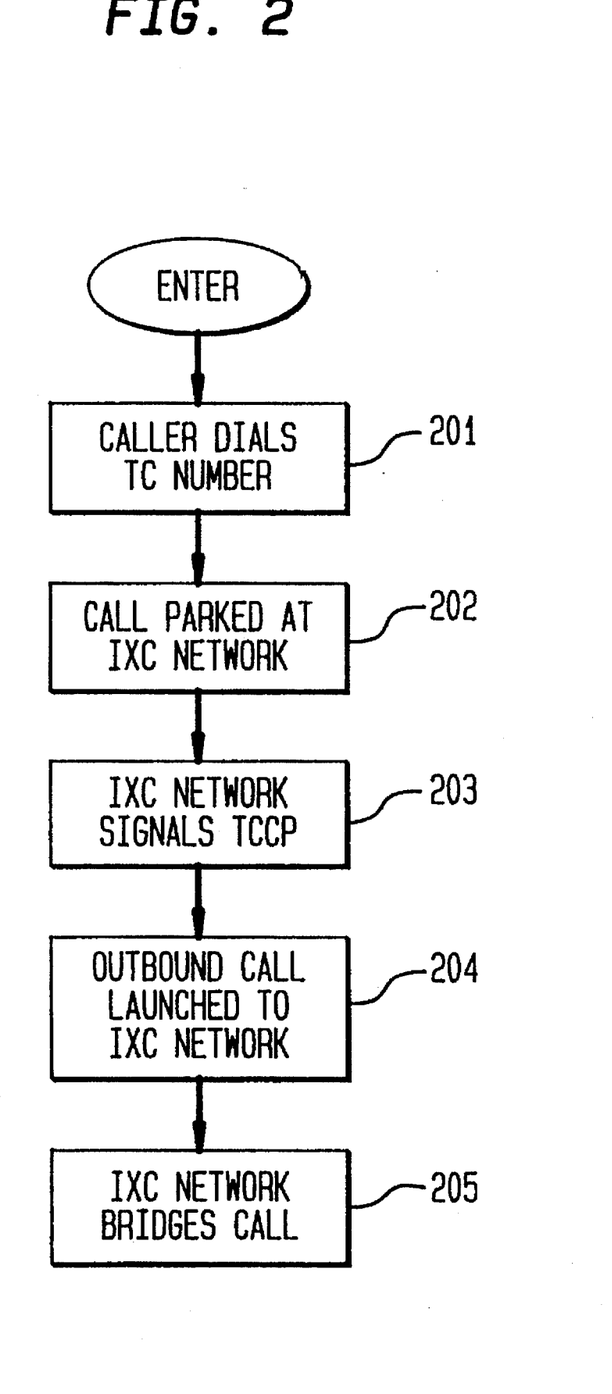
FIG. 2 is an operational flow chart of an exemplary process for implementing revertive calling automatic call distribution, in accordance with the present invention.

FIG. 2 is an operational flowchart illustrating a method for providing automatic call distribution of a call to a telemarketing complex, such as the one shown in FIG. 1, in accordance with the present invention. The process begins in step 201 when a caller decides to call a telemarketing agent for assistance, for example, for placing an order or obtaining product information for one or more campaigns. A toll-free (e.g., 800) number or other special access dialing code may be used such that the call arrives at the IXC network 103, which receives and "parks" the call (step 202) at, for example, a network switch or an AP, as described above. A unique 800 number or special access code may be assigned to a particular campaign or service, or each 800 number may be used for a variety of such telemarketing applications. In a further embodiment of the present invention, the network (e.g., an AP) may transmit voice band prompts to the caller, in order to obtain additional information to assist efficacious call handling. The caller responds, for example, by using the keypad to transmit dual tone multiple frequency (DTMF) signals to the network, which stores the appropriate additional information. The operation and implementation of voice band prompting is known in the art, and a greater understanding and appreciation may be obtained by referring to the aforementioned Asmuth patent.

Next, in step 203, the network forwards a signal to the TCCP via the SS7 data connection. This transmission preferably includes the caller automatic number identification (ANI), the dialed number, and a tag identifying the location in the network for addressing a call thereto. The transmission may also include the additional information obtained from the caller in response to IXC network originated queries to the caller, such as the type of information desired from an agent, the type of campaign, or the general nature of the call.

The TCCP, in response to this signaling, selects an appropriate telemarketing agent for handling the call parked in the IXC network, and initiates a call to the IXC network from the telemarketing agent, as represented by step 204. The TCCP allocates the agent based on processing the information it receives from both telemarketer premises-based information sources and public switched telecommunications network-based information sources (e.g., ANI, and tag number). The operation and implementation of agent allocation by call management systems (e.g., the TCCP) is known in the art. This outbound call is preferably setup by the TCCP via a signal transmitted to the appropriate ACD which, in response thereto, initiates call signaling from the telemarketing agent telephone station to the IXC network. As evident to one skilled in the art, such call signaling may be either in-band signaling or out-of-band signaling. Directing the outbound call to the IXC network is performed according to the tag received by the TCCP. Such a tag may be a phone number which routes the outbound call directly to an appropriate port in the IXC network. Alternatively, the TCCP launches the outbound call to a special access number which is preassigned for outbound calls to the IXC network, and the tag may represent augmenting address information (in-band or out-of-band) to identify the specific port in the network associated with the original incoming call. In accordance with the present invention, such an outbound call may include predictive dialing outbound call management techniques.

The network, in step 205, receives the outbound call, and merges this call with the inbound call, thus bridging the connection. Before performing this bridging, the network preferably ensures that the incoming call is still pending, (e.g., that the caller has not hung up). When the bridging is performed, the IXC network preferably signals the called telemarketing agent with a ringing signal, while providing a ringback signal to the calling party.

As a further embodiment, in step 204, when the TCCP receives the signal from the IXC network indicating that an incoming call is parked, the TCCP may provide signaling for retrieving caller profile information according to the ANI and/or additional information, and thus provide caller information to the agent before the bridging with the caller is complete. Clearly, such information may assist the agent in providing personalized service to the caller.

In a further embodiment of the present invention, to provide superior service to a set of premium callers, for example, the subscriber can "strategically deploy" a subset of agents to network port locations. That is, the TCCP allocates a subset of agents by initiating the outbound call to a network location before an incoming call from a caller is received. The outbound call, then, is parked at a network location. The network locations may be predetermined and fixed, or dynamically allocated via data communication between the TCCP and the NCP or USS. The TCCP can make decisions on how many agents to strategically deploy by using information available from the IXC interface 114 and the TC 105. Callers that are identified, for example by ANI, dialed number, or personal identification number (PIN), can be immediately connected to these "strategically deployed" agents and would, therefore, experience superior call setup characteristics.

In accordance with the present invention, it is understood that by using revertive calling techniques, call load management occurs on a call-by-call basis, with the queue effectively based in the IXC network and managed in accordance with the TCCP. Placing the queue closer to the originating source of the call, and managing the call routing according to information received from both the PSTN (e.g., ANI, and tag number) and the telemarketing complex results in more efficient call distribution than prior art call distribution systems, in addition to other myriad attendant advantages apparent to one skilled in the art.

Figure 3:
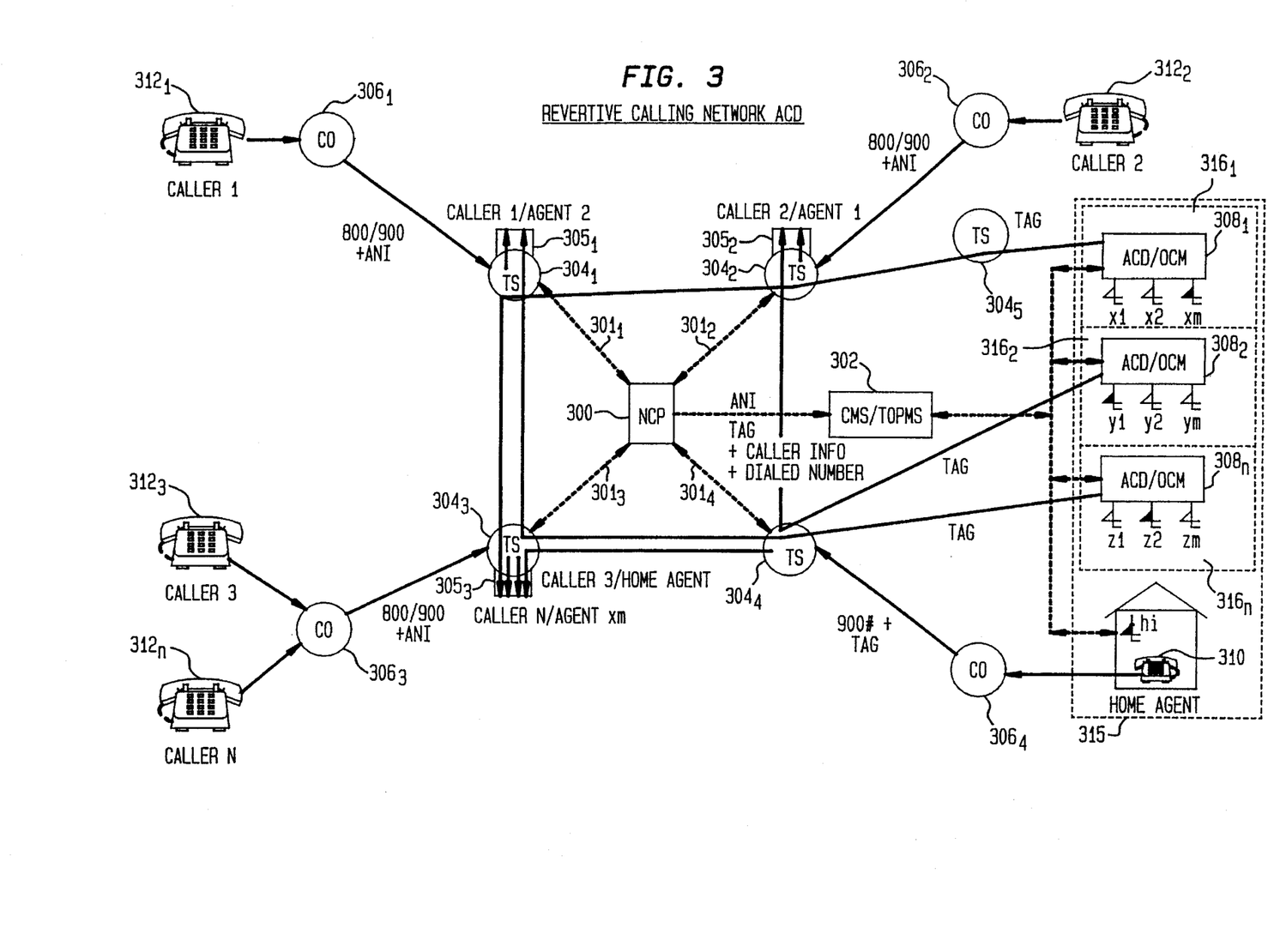
FIG. 3 depicts, in simplified form, another exemplary telephone network embodying the principles of the present invention.

The present invention can further be understood in accordance with another embodiment depicted in FIG. 3. Shown is the schematic relationship between calling stations $312_1$, $312_2$, $312_3$, $312_n$, LEC central offices (CO) $306_1$, $306_2$, $306_3$, $306_4$, network toll switches (TS) $304_1$, $304_2$, $304_3$, $304_4$, $304_5$, network control point (NCP) 300, call management system 302, and telemarketing complex 315.

The telemarketing complex 315 of the present embodiment includes a plurality of telecommunications centers (TCs) $316_1$, $316_2$, $316_n$, as well as home agent location 310. Typically, each of the TCs includes at least one ACD, and one or more split gates, each split comprising a group of agent terminals. TC $316_1$ includes ACD $308_1$, to which are connected a plurality of agent terminals x1, x2, xm. TC $316_2$ includes ACD $308_2$, to which are connected a plurality of agent terminals y1, y2, ym. TC $316_n$ includes ACD $308_n$, to which are connected a plurality of agent terminals y1, y2, ym. In addition, each ACD includes, as a dedicated system or as at least part of the ACD system, an outbound call manager (OCM) which comprises software and/or hardware for generating outbound calls from an agent terminal to a destination. The home agent location 310 also includes a means for launching an outbound call in response to a signal from the call management system 302, but since a home agent location typically does not include multiple agent terminals, the means for launching an outbound call does not necessarily include all the functionality of the OCM associated with an ACD. As mentioned above, the OCM, and the analagous means in the home agent location, may incorporate predictive dialing outbound call management systems and techniques. A call from an agent terminal to the network may be via direct-network connection, as between ACD $308_1$ and TS $304_5$, or switched access via a CO, such as between home agent location 310 and TS $304_4$.

The TSs are stored-program switches, such as the 4ESS or the 5ESS switch, and as shown, toll switches $304_1$, $304_2$, and $304_3$, preferably are connected to adjunct processors (AP) $305_1$, $305_2$, and $305_3$, respectively. The APs preferably provide functions such as receiving and "parking" a call (e.g., at a "meet-me bridge" or port), bridging a parked call with another call received by the network, and may also include a means for voice band prompting, such as an audio response unit which receives multifrequency tone (e.g., DTMF) entries from the calling party, and issues voice messages that elicit these tone responses.

NCP 300 communicates to TS $304_1$, TS $304_2$, TS $304_3$, and TS $304_4$ via bidirectional data links $301_1$, $301_2$, $301_3$, and $301_4$ (e.g., SS7). The function and operation of NCPs is well known in the art. In addition, the NCP is connected to call management system 302, which includes a centralized management system (CMS) and a telemarketing operations and planning management system (TOPMS), also referred to as a premises-based telemarketing agent management system. The call management system 302 is connected via a bidirectional data link to telecommunications complex 315 for receiving status information therefrom and providing control signals thereto.

Figure 4:
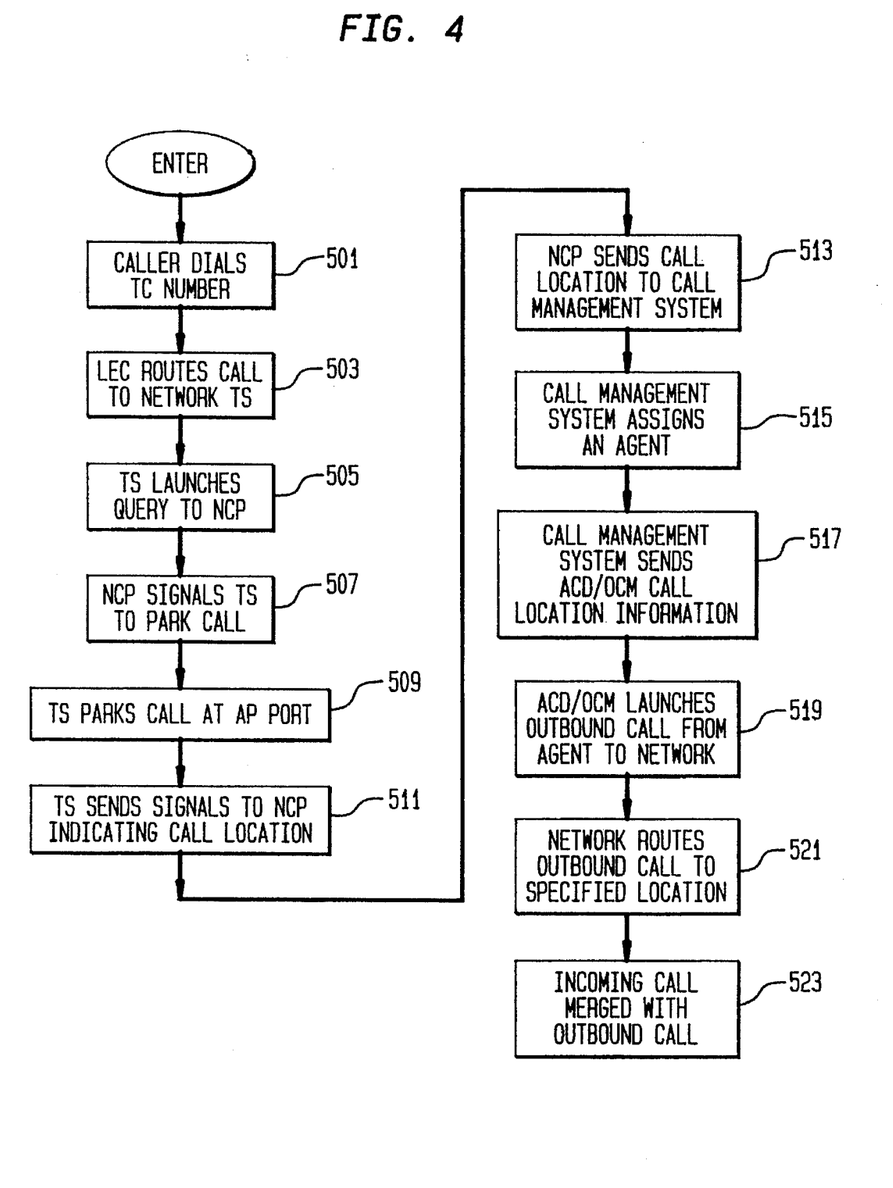
FIG. 4 depicts an operational flow chart of an exemplary process of network assisted automatic call, according to the present invention.

Referring to the operational flow chart illustrated in FIG. 4, an embodiment of the present invention proceeds as follows in accordance with the system represented by FIG. 3. In step 501, calling station $312_1$ places a call, dialing a number for connection to an agent associated with telemarketing complex 315. As understood with respect to such telemarketing systems, the dialed number does not uniquely identify a particular agent, and typically more than one number is available for accessing telemarketing complex 315.

Based on the number dialed (e.g., an 800 or 900 number), CO $306_1$ recognizes the call as one for special handling and routes the call to network TS $304_1$ using either in-band or out-of-band signaling, providing the caller ANI, and the dialed number to the network (step 503). Upon receiving the call, in step 505, the TS $304_1$ launches a query to NCP 300, providing the ANI and dialed 800 number. Based on this information, the NCP instructs the TS $304_1$ to hold (e.g., park) the call (step 507). In compliance with this instruction, in step 509, the TS $304_1$ assigns the call to a port (e.g., meet-me bridge) at AP $305_1$, and provides NCP 300 with the assigned port address (step 511). It is understood, however, that in certain instances it may be preferable or advantageous for NCP 300, in response to an initial query from a TS, to route the call for parking at another TS.

Next, in step 513, NCP 300 signals call management system 302, indicating that an incoming call is parked at a specified location indicated by the port address, and preferably providing the ANI and any additional caller information which may assist call handling (e.g., the dialed number, caller responses to prompts, etc.). The call management system 302, based on the signal received from NCP 300, and according to the status information received from the telemarketing complex 315 including ACDs and home agent 310, appropriately assigns an agent (step 5 15). For instance, based on the dialed number (e.g., which may indicate a particular campaign), the location of the caller as indicated by the ANI and/or NPA (numbering plan area, also known as Area Code), the availability of agents for a particular campaign, and the load being handled by the respective ACDs, the TOPMS determines an optimum agent for handling the call. Methods and systems for assigning an agent according to ACD status information, are known in the art. In effectuating a connection between the assigned agent and the called party, in step 517 the call management system 302 provides a signal to the appropriate ACD that indicates the selected agent and the location (i.e., the port address, including the TS location) at which the calling party's incoming call is parked. The related OCM then initiates an outbound call to this location (step 519) from the selected agent. Referring to FIG. 3, for the example of caller $312_1$, the call management system 302 determines that the appropriate agent for assigning to the incoming call is agent z2, and accordingly provides to ACD $308_n$ a signal that includes the appropriate port and TS (i.e., TS $304_1$) of the parked incoming call, as well as the selected agent.

As shown, ACD $308_n$ is connected to TS $304_4$, which appropriately routes the outbound call to TS $304_1$ via TS $304_3$ (step 521), which in turn handles the outbound call by routing it to the appropriate port in AP $305_1$, thus bridging the connection (step 523). Routing such calls to terminate at TSs within the network may be achieved by a variety of means known in the art, such as using different numbering plans or different accessing arrangements (e.g., out-of-band signaling). It is also understood that the execution of tasks involved in port assignment, routing, and call bridging may be allocated between the TS and the AP in a variety of ways. In addition, as discussed above, prior to bridging the connection the AP preferably ensures that the parked incoming call from caller $312_1$ has not been abandoned. Moreover, as part of the signaling, the network provides appropriate ringing and ringback tones to the called party and the calling party, respectively.

Referring further to FIG. 3, it can be seen that callers $312_2$, $312_3$, and $312_n$ are also each connected to an appropriately assigned agent, namely agent terminal y1, h1, and xm, respectively, in accordance with the method of the present invention. Particularly, it can be seen that the outbound call from agent terminal xm to AP $305_3$ is routed via TS $304_5$, TS $304_2$, TS $304_1$, and TS $304_3$, whereas the outbound call from agent terminal y1 traverses TS $304_4$ to arrive at TS $304_2$.

In accordance with an embodiment of the present invention, an outbound call from home agent location 310 is directed to the network via a CO $306_4$ by preferably using an 800 number. Use of an 800 number for directing outbound calls from home agents is preferred because no calling charges are consequently assumed by the home agent. In addition, such a number is consistent with conventional special number handling procedures currently used by LECs. The 800 number is assigned by the NCP 300 in response to step 511 in which the NCP 300 receives the location (e.g., port number) from a given TS. The 800 number may be assigned in a variety of ways. Some of the possibilities include: the 800 number may uniquely identify a port and a specific TS; the 800 number may only identify a TS and the port is identified by separate port address information (e.g., tag number); or the port number may identify both the port and the TS, while the 800 number is used only for purposes of accessing the network via a LEC (i.e., where there is no direct access to the network from the agent terminal). Where the 800 number represents a TS location or a port and TS location, the 800 number itself may directly represent this information, or the 800 number may be a pointer (e.g., index) to this information which is stored in an NCP database and accessed via a look-up or number translation procedure. In step 513 the 800 number is sent to the call management system 302, and the location information not included within the 800 number is sent as the port location number (e.g., tag number). As discussed above, depending on the convention chosen, the port location number may specify only the port address or may include both the port address and TS location.

After steps 515 and 517 are executed, in step 519, upon receiving an outbound call to an 800 number, a CO (e.g., CO $306_4$) routes the call to a TS (e.g., TS $304_4$), which in turn launches a query to the NCP (e.g., NCP 300) in the usual way. Depending on the way that the 800 number is allocated, several possible actions may occur. First, if the 800 number uniquely identifies a port and a destination TS (e.g., TS $304_3$), the NCP 300 instructs the TS (e.g., TS $304_4$) to route the call accordingly after the NCP 300 translates the 800 number to the port number and TS location (i.e., if the port number and TS location were mapped to an 800 number). Alternatively, if the 800 number does not uniquely identify the TS and port, additional information (e.g., tag number) is collected from h1 (using ether inband or out-of-band signaling) to identify the TS and port. One skilled in the art recognizes that the foregoing examples are not intended to limit the myriad ways that the port address information may be encoded or allocated, or the ways that outbound calls associated with the method of the present invention may be identified and routed to the appropriate physical location within the network.

As discussed hereinabove in connection with FIG. 1, the method and system discussed in connection with FIG. 3 and FIG. 4 may also be adapted to represent additional embodiments and features, including interactive queuing and retrieval of caller profile information, as well as strategic deployment of a subset of agents.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. Although the revertive calling automatic call distributor was described hereinabove in connection with the telecommunications system shown in FIG. 1, it is understood by one skilled in the art that the present invention is not inherently coupled to the system shown in FIG. 1, which simply illustrates a system in which the present invention may be practiced. For example, the TCCP may receive diverse kinds of information from various sources, neither limited to, nor requiring, the information described hereinabove. Similarly, the TCCP may process such information according to many different methods for managing the call distribution among the telemarketing complex. It is understood, therefore, that the TCCP described hereinabove is only a particular example of what may be more generically described as a telemarketing agent management system or call management system. In addition, according to the present invention, it is not necessary for any of the telemarketing agents to be connected to an ACD or a TC—i.e., all agents may be home agents. In such an embodiment, since there are no locations containing a large number of agents, it may be more practical to implement the functionality of the call management system (e.g., TCCM or TPMS) within the network itself.

It is further understood that although the present invention is hereinabove described in accordance with an interexchange network and with respect to its connection to LEC networks, the present invention, as understood by one skilled in the art, may be practiced and is equally applicable within an LEC network. For instance, referring to FIG. 3, absent regulations regarding LEC traffic, an LEC Service Control Point (SCP) may assume the function of NCP 300, including an interface to a call management system 302, and adjunct processors may be connected to COs, which assume the function of the TSs and are interconnected by bridges. Such an example is only illustrative of the many ways the present invention may be practiced in an LEC network, and it is understood that many equivalent implementations exist, and further, that the present invention may also be practiced across international network boundaries.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A network assisted method for automatically distributing calls to a subscriber among a plurality of agent terminals of the subscriber, said subscriber identified by a telephone number which does not uniquely identify a particular one of said plurality of agent terminals, and each agent terminal associated with an outbound call management means for launching a call from the agent terminal in response to a signal received from a call management system which is operative in monitoring call traffic status information of said subscriber, the method comprising the steps of:

receiving at the network a first call directed to said subscriber from a calling party;

parking said first call at a network location;

transmitting from the network a signal indicative of said first call at the network location to said call management system in response to said first call;

receiving at the network a second call directed to the network from a designated agent terminal, said designated agent terminal selected and said second call being established according to a signal generated by said call management system in response to said signal indicative of said first call and transmitted to the outbound call management means associated with said designated party in order to launch the second call;

connecting said calling party with said agent terminal by bridging at the network the first call parked at the network location with said second call.

2. The method according to claim 1, further comprising, before said step of connecting, the step of checking if said first call remains in progress.

3. The method according to claim 1, wherein said signal from said call management system to said outbound call management means includes out-of-band signaling.

4. The method according to claim 1, wherein said signal indicative of said first call includes caller identification information.

5. The method according to claim 4, wherein said caller identification information includes an automatic number identification code.

6. The method according to claim 1, wherein said signal indicative of said first call includes information indicating a destination in the network for said second call.

7. The method according to claim 1, further comprising, after receiving said first call from said calling party, the steps of signaling an information query to said calling party, and receiving information signals from said calling party in response to said information query.

8. The method according to claim 7, wherein said signal indicative of said first call includes information from said information signals.

9. The method according to claim 7, further comprising the step of transmitting information from said information signals to said call management system.

10. The method according to claim 7, further comprising the step of said call management system, in response to said signal indicative of said first call, selectively retrieving additional stored information associated with the calling party.

11. The method according to claim 10, further comprising the step of said call management system providing said additional information to said designated agent terminal.

12. The method according to claim 1, further comprising predictive calls directed from said agent terminals to said network, wherein said predictive calls are initiated according to predictive-dialing techniques executed by said outbound call management means.

13. The method according to claim 1, further comprising the step of providing a ringing signal to said designated agent terminal and a ringback signal to said caller in response to said outbound call management means receiving the signal transmitted thereto from said call management system.

14. The method according to claim 1, further comprising the steps of:

before said receiving step, preassigning an agent terminal by receiving at the network a preassignment call from one of said agent terminals to the network, said preassignment call launched by said outbound call management means independently of said signal transmitted from said call management system to the outbound call management means; and after said receiving step, connecting at the network said first call to one of said preassignment calls where said first call satisfies a predetermined condition.

15. A telecommunications network based system for automatically distributing calls to a subscriber among a plurality of agent terminals of the subscriber, said subscriber identified by a telephone number which does not uniquely identify a particular one of said plurality of agent terminals, said system comprising:

an outbound call management means associated with each of said agent terminals for controlling launching of calls from the agent terminals;

a network control means for receiving a first call directed to said subscriber from a calling party, parking said first call at a network location, and generating a first signal indicative of said first call at the network location in response to receipt of said first call;

a call management system for receiving information representing status of said subscriber agent terminals, for receiving said first signal from the network control means, and for generating in response to said first signal a second signal that is transmitted to the outbound call management means which responds to the second signal by launching a second call from a designated agent terminal to the network location; and connecting means in said network responsive to said second call for connecting said calling party to said designated agent terminal by bridging said first call and said second call.

16. The system according to claim 15, wherein:

a group of said agent terminals are coupled to an automatic call distributor system which includes the outbound call management means associated with the group of agent terminals for launching a call from any one of the agent terminals of the group; and wherein the automatic call distributor is coupled to said call management system by a first communication link means for communicating said second signal and said information representing status, and is coupled to the telecommunications network by a second communication link for communicating said second call.

* * * * *